(12) United States Patent
Matsumoto

(10) Patent No.: US 10,032,198 B2
(45) Date of Patent: Jul. 24, 2018

(54) INFORMATION PROCESSING APPARATUS, CONSUMABLES ORDERING SYSTEM, AND COMPUTER PROGRAM PRODUCT

(71) Applicant: Takuya Matsumoto, Tokyo (JP)

(72) Inventor: Takuya Matsumoto, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 518 days.

(21) Appl. No.: 14/637,832

(22) Filed: Mar. 4, 2015

(65) Prior Publication Data
US 2015/0262272 A1 Sep. 17, 2015

(30) Foreign Application Priority Data

Mar. 17, 2014 (JP) .................................. 2014-053892

(51) Int. Cl.
G06Q 30/00 (2012.01)
G06Q 30/06 (2012.01)
H04L 29/06 (2006.01)

(52) U.S. Cl.
CPC ..... *G06Q 30/0609* (2013.01); *G06Q 30/0635* (2013.01); *H04L 63/083* (2013.01)

(58) Field of Classification Search
CPC ............ G06Q 30/0609; G06Q 30/0635; H04L 63/083; G03G 15/5016
See application file for complete search history.

(56) References Cited

U.S. PATENT DOCUMENTS 6,798,997 B1 * 9/2004 Hayward ............... G06Q 30/02
347/50

6,937,999 B1 * 8/2005 Haines .................. G06Q 30/06
399/10

(Continued)

FOREIGN PATENT DOCUMENTS

CN 1508738 A 6/2004
CN 102402739 A 4/2012
(Continued)

OTHER PUBLICATIONS http://support.brother.com/g/b/faqend.aspx?c=us&lang=en&prod=hl3045cn_us_as&faqid=faq00000065_049 (Year: 2013).*

(Continued)

*Primary Examiner* — Matthew E Zimmerman
(74) *Attorney, Agent, or Firm* — Harness, Dickey & Pierce, P.L.C.

(57) ABSTRACT

An information processing apparatus includes a login screen display processing unit that causes a display device to display a login screen for enabling a request for login to an online shopping service that sells the consumables through a network to be made; a login request transmitting unit transmits the request for login to the online shopping service based on authentication information input through the login screen; a model identification information transmitting unit transmits model identification information for identifying a model of the information processing apparatus; and a screen display processing unit that, in response to a response to the login request, causes the display device to display a screen for enabling use of the online shopping service. The screen display processing unit displays, as articles to be sold, consumables extracted based on the transmitted model identification information from the consumables being sold by the online shopping service.

13 Claims, 12 Drawing Sheets

(56) References Cited

U.S. PATENT DOCUMENTS

| | | | |
|---|---|---|---|
| 6,965,441 B1* | 11/2005 | Haines | G03G 15/5016 358/1.14 |
| 7,062,451 B1* | 6/2006 | Dentel | G06Q 30/06 705/26.7 |
| 7,475,026 B2 | 1/2009 | Rock, Jr. et al. | |
| 2002/0002492 A1* | 1/2002 | Okazawa | G06Q 30/02 705/14.35 |
| 2002/0049638 A1 | 4/2002 | Ito | |
| 2002/0055883 A1* | 5/2002 | Shiba | G06Q 10/087 705/26.1 |
| 2003/0004832 A1* | 1/2003 | Kamimoto | G06Q 10/087 705/26.41 |
| 2005/0147440 A1* | 7/2005 | Nakanishi | B41J 2/17546 400/62 |
| 2005/0154651 A1* | 7/2005 | Bezos | G06Q 10/087 705/26.8 |
| 2007/0255628 A1* | 11/2007 | Takahashi | G06Q 30/06 705/26.1 |
| 2008/0015944 A1* | 1/2008 | Nose | G06Q 10/087 705/22 |
| 2008/0071626 A1* | 3/2008 | Hill | G06Q 10/00 705/22 |
| 2009/0016743 A1* | 1/2009 | Tye | G03G 15/55 399/8 |
| 2009/0106125 A1 | 4/2009 | Rock, Jr. et al. | |
| 2011/0261380 A1* | 10/2011 | Kwon | G03G 15/5016 358/1.13 |
| 2012/0179579 A1 | 7/2012 | Kunihiro et al. | |
| 2013/0028616 A1* | 1/2013 | Kunihiro | G06F 3/1204 399/27 |
| 2013/0332303 A1* | 12/2013 | Schank | G06Q 30/0641 705/26.4 |
| 2015/0262285 A1 | 9/2015 | Kunihiro et al. | |

FOREIGN PATENT DOCUMENTS

| | | |
|---|---|---|
| CN | 102591166 A | 7/2012 |
| JP | 2003-330695 | 11/2003 |
| JP | 2004-86414 A | 3/2004 |
| JP | 2007-011813 | 1/2007 |
| JP | 2007226506 A | 9/2007 |
| JP | 2013-11727 A | 1/2013 |
| JP | 2013-125289 | 6/2013 |

OTHER PUBLICATIONS

Office Action from corresponding Chinese patent application 201510114048.X, dated Jul. 17, 2017.

Japanese Office Action dated Jan. 30, 2018 issued in corresponding Japanese Application No. 2014-053892 (with translation).

* cited by examiner

| USER ID | LOGIN PASSWORD | ORGANIZATION ID | |
|---|---|---|---|
| user001 | xxxxxxxxxxxxx | org001 | ... |
| user002 | xxxxxxxxxxxxx | org001 | |
| user003 | xxxxxxxxxxxxx | org002 | |
| ... | | | |

FIG.8

| ORGANIZATION ID | ARTICLE ID | UNIT PRICE | PATH OF ARTICLE IMAGE FILE | |
|---|---|---|---|---|
| org001 | item001 | xxxx | ¥¥xxx¥xxxx¥xxxxxx... | ... |
| org001 | item002 | xxxx | ¥¥xxx¥xxxx¥xxxxxx... | |
| org001 | item003 | xxxx | ¥¥xxx¥xxxx¥xxxxxx... | |
| ... | | | | |

FIG.9

| MODEL | ARTICLE 1 | ARTICLE 2 | ARTICLE 3 | ARTICLE 4 | ARTICLE 5 | ARTICLE 6 | ARTICLE 7 | |
|---|---|---|---|---|---|---|---|---|
| MFP11-1 | item011 | item021 | item031 | item041 | item051 | item061 | item071 | ... |
| MFP12-1 | item012 | item022 | item032 | item042 | item052 | item062 | item072 | |
| PRT13-2 | item013 | item023 | item033 | item043 | item053 | item063 | item073 | |
| ... | | | | | | | | |

FIG.10

| INDIVIDUAL ID | MODEL | ORGANIZATION ID | |
|---|---|---|---|
| mach001 | MFP11-1 | user001 | ... |
| mach002 | MFP12-1 | user002 | |
| mach003 | PRT13-2 | user003 | |
| ... | | | |

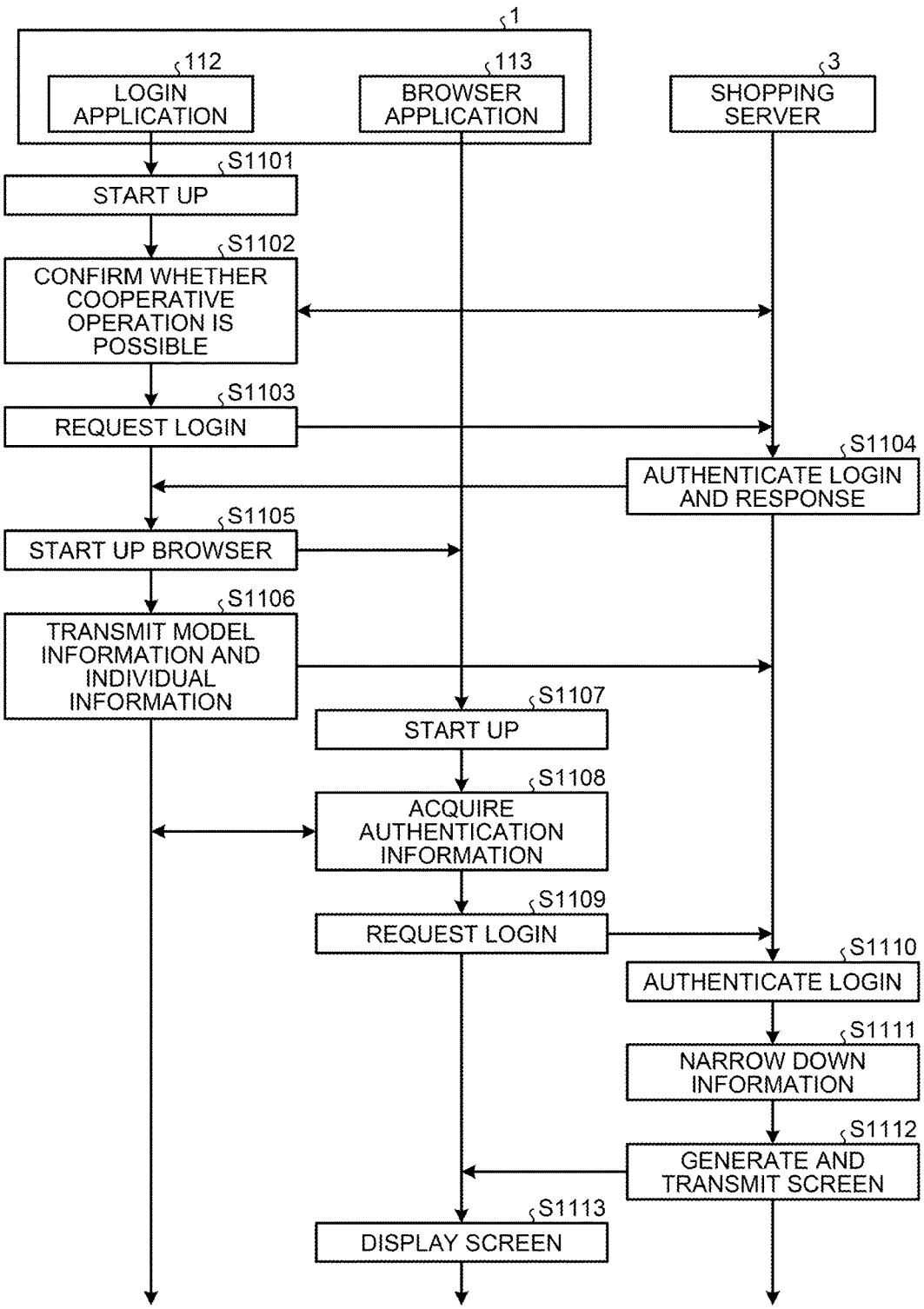

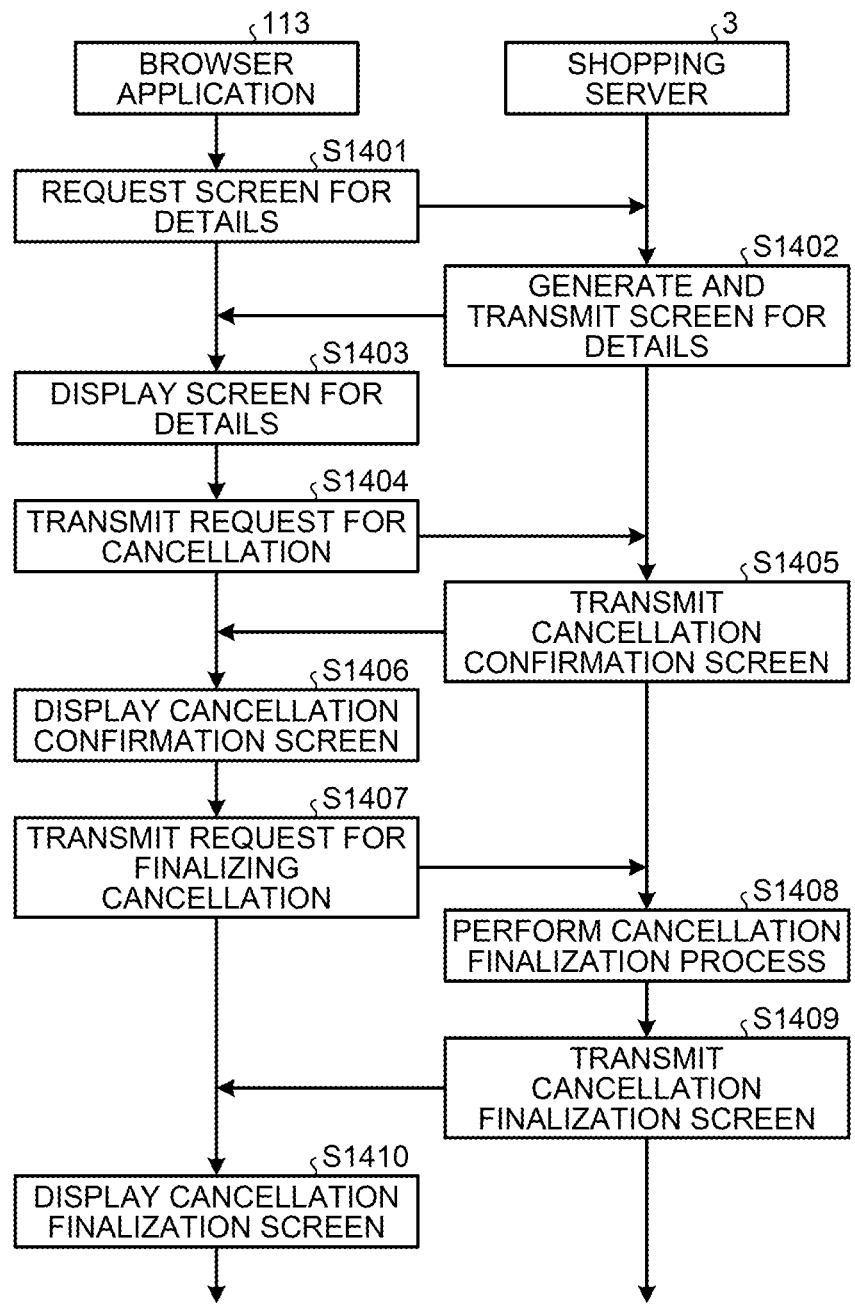

FIG.15

CONSUMABLES ORDERING SITE — 104

ORDER NUMBER : xxxx
DATE OF ORDER : xxxx
PERSON WHO ORDERED : xxxx

WANT THIS ORDER CANCELLED

DETAILS OF ORDER
...

FIG.16

CONSUMABLES ORDERING SITE — 104

ORDER NUMBER : xxxx

ORDER CANCELLATION
THIS ORDER WILL BE CANCELLED.
DO YOU REALLY WANT IT CANCELLED?

| WANT IT CANCELLED | DO NOT WANT IT CANCELLED |

FIG.17

| STATUS | WHETHER CANCELLATION IS ALLOWED |
| --- | --- |
| CHECKING STOCK | YES |
| ALLOCATING STOCK | YES |
| PREPARING SHIPMENT | YES |
| COMPLETED PREPARATION FOR SHIPMENT | NO |
| COMPLETED SHIPMENT | NO |
| ... | |

INFORMATION PROCESSING APPARATUS, CONSUMABLES ORDERING SYSTEM, AND COMPUTER PROGRAM PRODUCT

CROSS-REFERENCE TO RELATED APPLICATIONS

The present application claims priority to and incorporates by reference the entire contents of Japanese Patent Application No. 2014-053892 filed in Japan on Mar. 17, 2014.

BACKGROUND OF THE INVENTION

1. Field of the Invention

The present invention relates to an information processing apparatus, a consumables ordering system, and a computer program product.

2. Description of the Related Art

Recently, in line with the trend toward promotion of computerization of information, image processing apparatuses such as a printer and a facsimile used for outputting computerized information and a scanner used for computerizing documents have become indispensable machines. Such an image processing apparatus is often configured as a multifunction peripheral usable as a printer, a facsimile, a scanner, and a copier by including an image capturing function, an image forming function, a communication function, and the like.

In such an image processing apparatus, it is necessary to replace consumables used in, for example, a mechanism for forming and outputting an image. Methods disclosed so far for enhancing the convenience in ordering such consumables include those in which an ordering process is performed when a remaining toner amount has reached a predetermined threshold (refer to, for example, Japanese Patent Application Laid-open No. 2007-11813).

Other methods disclosed so far include those in which a remote management function intended for maintenance of an apparatus is used not only for monitoring conditions of the image processing apparatus but also for implementing an ordering function for replacing consumables (refer to, for example, Japanese Patent Application Laid-open No. 2003-330695 and Japanese Patent Application Laid-open No. 2013-125289).

For smooth operation of an image processing apparatus, it is necessary to appropriately replace consumables so as to prevent a condition that disables formation and outputting of an image occurring for such reasons as running out of toner. Thus, it is necessary to make it more convenient for a user to order consumables. Use of a technique such as the one disclosed in Japanese Patent Application Laid-open No. 2003-330695 or Japanese Patent Application Laid-open No. 2013-125289 makes it possible to manage consumables according to conditions of the image processing apparatus. In some cases, however, a management method using remote management is not desired, for example, because of security issues. In some cases, remote management is difficult because of a network environment in which the image processing apparatus is operated.

On the other hand, use of the technique disclosed in Japanese Patent Application Laid-open No. 2007-11813 makes it possible to order consumables by using an user interface provided to the image processing apparatus, and makes an ordering process more convenient for a user while eliminating the need to use a method using remote management as disclosed in Japanese Patent Application Laid-open No. 2003-330695 or Japanese Patent Application Laid-open No. 2013-125289. However, the technique disclosed in Japanese Patent Application Laid-open No. 2007-11813 disregards selection of a consumable to be ordered in ordering the consumable.

A manufacturer provides apparatuses of various kinds, and consumables provided for these apparatuses are inevitably various in kind. Such a situation makes it difficult for an unaccustomed user to select and order consumables properly corresponding to the respective apparatuses out of consumables of various kinds. This kind of inconvenience equally occurs not only to an image processing apparatus but also to an apparatus that implements a specific function and contains consumables.

Therefore, there is a need for an information processing apparatus and a consumables ordering system that makes it easier for a user to select and order a consumable in management of an apparatus that contains consumables and implements a specific function.

SUMMARY OF THE INVENTION

According to an embodiment, an information processing apparatus implements a specific function by using consumables contained therein. The information processing apparatus includes a login screen display processing unit that causes a display device to display a login screen for enabling a request for login to an online shopping service that sells the consumables through a network to be made; a login request transmitting unit that transmits the request for login to the online shopping service based on authentication information input through the login screen; a model identification information transmitting unit that transmits model identification information for identifying a model of the information processing apparatus; and a screen display processing unit that, in response to a response to the login request, causes the display device to display a screen for enabling use of the online shopping service. The screen display processing unit displays, as articles to be sold, consumables extracted based on the transmitted model identification information from the consumables being sold by the online shopping service.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating a unit price DB according to the embodiment;

FIG. 9 is a diagram illustrating a corresponding article DB according to the embodiment;

FIG. 10 is a diagram illustrating an individual identification DB according to the embodiment;

FIG. 11 is a sequence diagram illustrating login operation in the system according to the embodiment;

FIG. 14 is a sequence diagram illustrating order cancellation operation according to the embodiment;

FIG. 15 is a diagram illustrating a screen display of the image processing apparatus according to the embodiment;

FIG. 16 is a diagram illustrating a screen display of the image processing apparatus according to the embodiment;

FIG. 17 is a diagram illustrating whether cancellation is allowed by each status according to the embodiment;

DETAILED DESCRIPTION OF THE PREFERRED EMBODIMENTS

The following describes an embodiment with reference to the drawings. In this embodiment, a consumables ordering system for ordering consumables to be contained in an image processing apparatus such as a multifunction peripheral (MFP) is described, with which the consumables are ordered through a user interface of the MFP. Note that the MFP described below is one example of an information processing apparatus that implements a specialized function by using consumables contained therein. This embodiment is also similarly applicable to any apparatus that implements a specialized function by using consumables contained therein. Examples of such an apparatus include a post-processing apparatus that performs post-processing on output paper, an office machine such as a projector, and a home electrical appliance.

Figure 1:
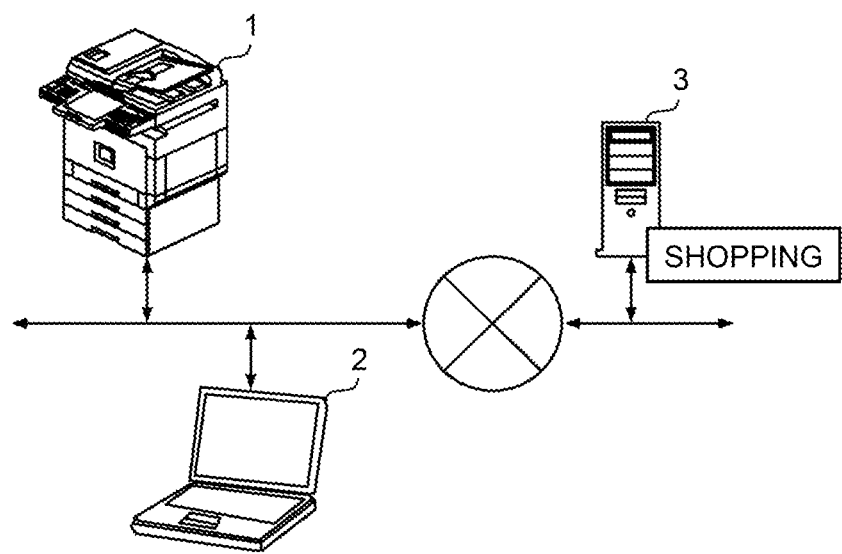
FIG. 1 is a diagram illustrating an operation form of a system according to an embodiment.

FIG. 1 is a diagram illustrating an operation form of the consumables ordering system according to this embodiment. As illustrated in FIG. 1, the system according to this embodiment includes an image processing apparatus 1 to which consumables are supplied, a client terminal 2 connected to the same network as the image processing apparatus 1 is connected to, and a shopping server 3 functioning as a service providing server that provides a shopping site at which orders for consumables are placed. The image processing apparatus 1 and the client terminal 2 are connected to the same network such as an office local area network (LAN), and are connected through a network line such as the Internet to a network connected to the shopping server 3.

The image processing apparatus 1 according to this embodiment is a highly functional, large apparatus such as an MFP, and contains a number of consumables such as a process cartridge or a toner bottle, which is used for output of image formation. The image processing apparatus 1 further includes a user interface including components such as a touch panel for allowing operations to be performed on the apparatus. It is one of the key points according to this embodiment that ordering to the shopping server 3 is implemented through operations on this user interface.

The client terminal 2 is implemented by a general information processing apparatus such as a personal computer (PC), and implements, for example, a function for generating a print job to cause the image processing apparatus 1 to execute output of image formation and transmitting the print job to the image processing apparatus 1, and a function for accessing the shopping server 3 through a general Internet browser to order an article.

The shopping server 3 is a server that provides a website for accepting Web access from the image processing apparatus 1 and the client terminal 2 and provides a shopping service through the Internet by using the website. The shopping server 3 according to this embodiment responds to ordering of a consumable that has been performed through the user interface of the image processing apparatus 1, and includes functions for improving user convenience. Details of the shopping server 3 are described later.

Next, the hardware configuration of an information processing apparatus according to this embodiment such as the image processing apparatus 1, the client terminal 2, or the shopping server 3 is described with reference to FIG. 2. Here, the image processing apparatus 1 includes not only the hardware configuration illustrated in FIG. 2 but also an engine for bringing a scanner, a printer, and the like into operation.

Figure 2:
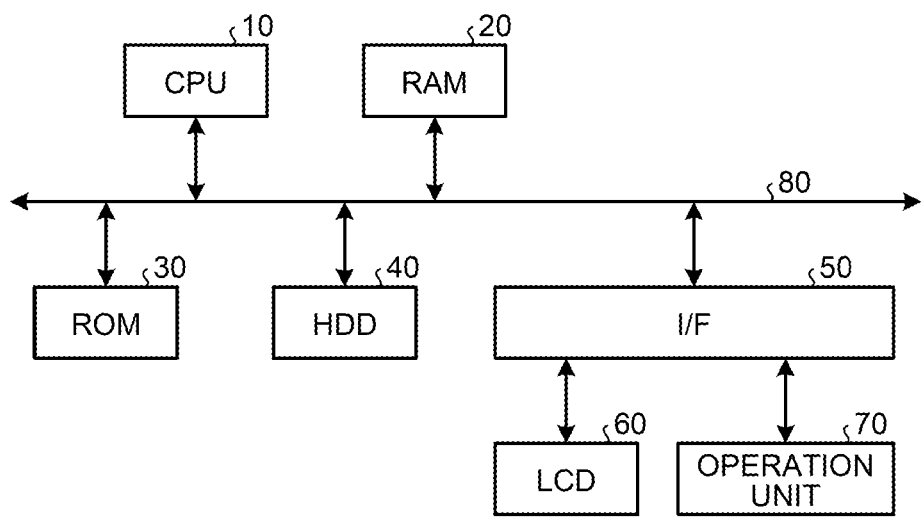
FIG. 2 is a block diagram illustrating the hardware configuration of an information processing apparatus according to the embodiment.

As illustrated in FIG. 2, the information processing apparatus according to this embodiment includes the same configuration as that included in a server, a personal computer (PC), or the like that is used in general. More specifically, the information processing apparatus according to this embodiment includes a central processing unit (CPU) 10, a random access memory (RAM) 20, a read only memory (ROM) 30, a hard disk drive (HDD) 40, and an interface (I/F) 50 connected to one another through a bus 80. A liquid crystal display (LCD) 60 and an operation unit 70 are further connected to the I/F 50.

The CPU 10 is an arithmetic operation unit and controls operation of the entire information processing apparatus. The RAM 20 is a volatile storage medium capable of reading and writing information at high speed and is used as a work area when the CPU 10 processes information. The ROM 30 is a read-only non-volatile storage medium and stores a computer program such as firmware. The HDD 40 is a readable and writable non-volatile storage medium and stores, for example, an operating system (OS), various control programs, and various application programs.

The I/F 50 connects the bus 80 to various kinds of hardware, a network, and the like to control them. The LCD 60 is a visual user interface for a user to check conditions of the information processing apparatus. The operation unit 70 is a user interface, such as a keyboard and a mouse, for a user to input information to the information processing apparatus. Note that the shopping server 3 according to this embodiment operates as a server that does not accept operations directly from the user, and can operate without user interfaces such as the LCD 60 and the operation unit 70.

In this hardware configuration, a software controller is configured by causing the CPU 10 to execute arithmetic operations according to a computer program stored in the ROM 30 or a computer program loaded on the RAM 20 from a storage medium such as the HDD 40 or an optical disc (not illustrated). A functional block that implements functions of each of the image processing apparatus 1, the client terminal 2, and the shopping server 3 according to this embodiment is configured by combination of the thus configured software controller and hardware.

Figure 3:
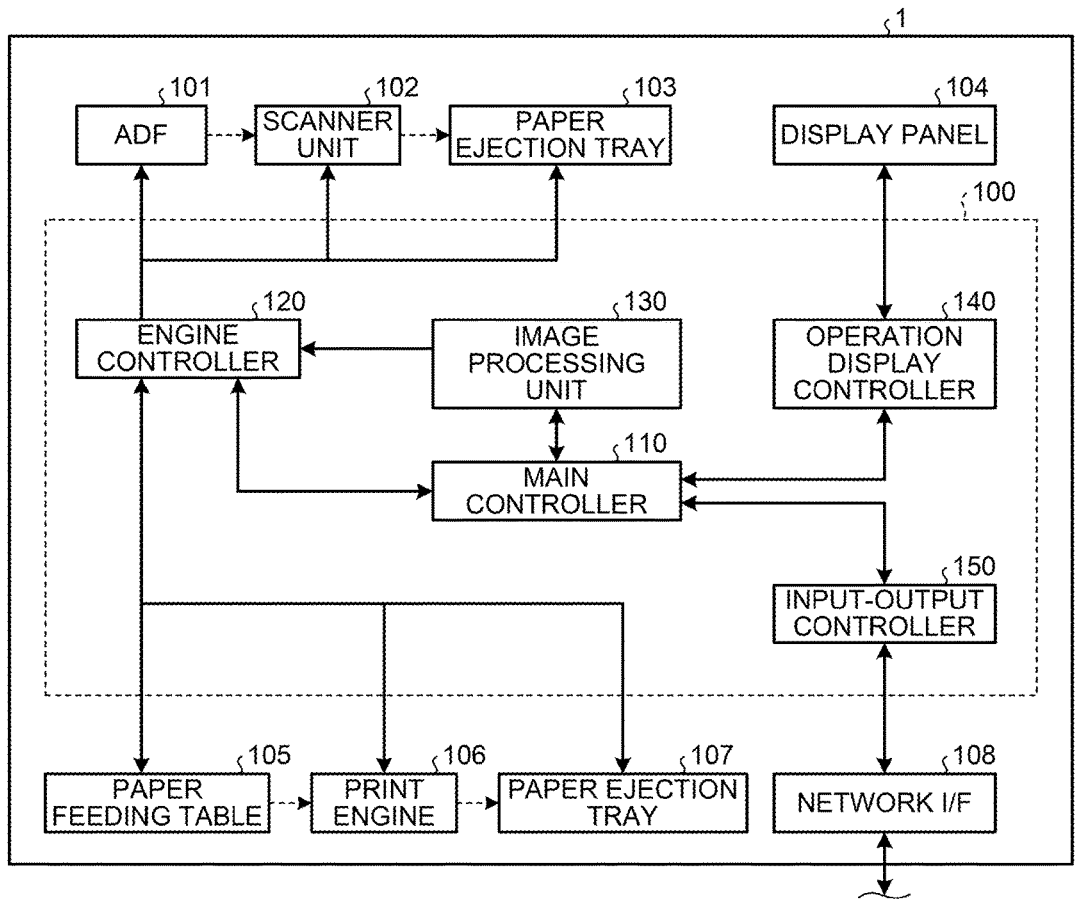
FIG. 3 is a block diagram illustrating the functional configuration of an image processing apparatus according to the embodiment.

Next, the functional configuration of the image processing apparatus 1 according to this embodiment is described with reference to FIG. 3. FIG. 3 is a block diagram illustrating the functional configuration of the image processing apparatus 1 according to this embodiment. As illustrated in FIG. 3, the image processing apparatus 1 according to this embodiment includes a controller 100, an auto document feeder (ADF) 101, a scanner unit 102, a paper ejection tray 103, a display panel 104, a paper feeding table 105, a print engine 106, a paper ejection tray 107, and a network I/F 108.

The controller 100 includes a main controller 110, an engine controller 120, an image processing unit 130, an operation display controller 140, and an input-output controller 150. As illustrated in FIG. 3, the image processing apparatus 1 according to this embodiment is configured as a multifunction peripheral that includes the scanner unit 102 and the print engine 106. In FIG. 3, solid arrows indicate electrical connections, and dashed arrows indicate flows of paper.

The display panel 104 serves not only as an output interface that visually displays conditions of the image processing apparatus 1 but also as an input interface in the form of a touch panel to be used by the user to directly operate the image processing apparatus 1 or to input information to the image processing apparatus 1. More specifically, the display panel 104 has the function of displaying images for accepting operations from the user. The display panel 104 is implemented by the LCD 60 and the operation unit 70 illustrated in FIG. 2. A process of ordering a consumable to the shopping server 3 through the display panel 104 is one of the key points according to this embodiment.

The network I/F 108 is an interface used by the image processing apparatus 1 to communicate with other apparatuses such as the client terminal 2 through a network, and is implemented by an Ethernet (trademark) interface, a universal serial bus (USB) interface, or the like. The network I/F 108 is capable of communicating according to the TCP/IP protocol. The network I/F 108 also functions as an interface for executing facsimile transmission when the image processing apparatus 1 functions as a facsimile machine. The network I/F 108 is connected also to a telephone line for this reason. The network I/F 108 is implemented by the I/F 50 illustrated in FIG. 2.

The controller 100 is configured by combination of software and hardware. Specifically, the controller 100 is configured by a software controller and hardware such as an integrated circuit. The software controller is configured by storing computer programs in the ROM 30 or a non-volatile memory and a non-volatile storage medium such as the HDD 40 or an optical disc to load the computer programs on a volatile memory (hereinafter, a memory) such as the RAM 20, and causing the CPU 10 to perform arithmetic operations according to the computer programs. The controller 100 functions as a controller that controls the entirety of the image processing apparatus 1.

Figure 4:
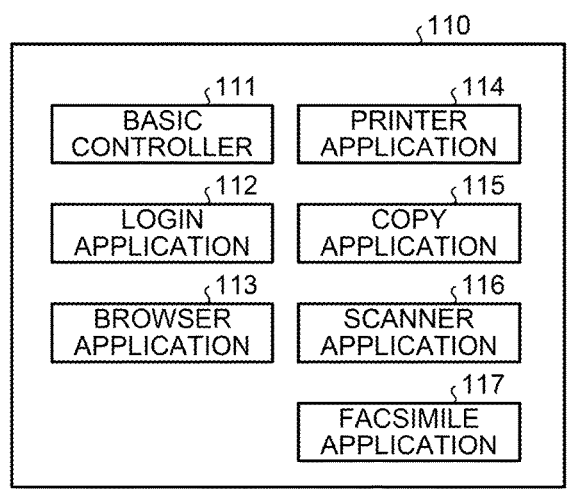
FIG. 4 is a diagram illustrating the software configuration of a main controller according to the embodiment.

The main controller 110 fills the role of controlling each unit included in the controller 100, and provides instructions to each unit of the controller 100. With reference to FIG. 4, software that constitutes the main controller 110 is described. As illustrated in FIG. 4, the main controller 110 includes a basic controller 111, a login application 112, a browser application 113, a printer application 114, a copy application 115, and a scanner application 116 and a FAX application 117.

The basic controller 111 is software for controlling basic functions of the image processing apparatus 1 and is implemented by such software as an OS. The login application 112 is software that provides functions for logging in to the shopping server 3 and exchanging information with the shopping server 3 when the shopping server 3 is accessed through the display panel 104 of the image processing apparatus 1 in ordering of a consumable. The functions provided by the login application 112 are one of the key points according to this embodiment.

The browser application 113 has the same functions as a general Internet browser has, and provides functions for enabling use of an online shopping service provided by the shopping server 3. The printer application 114 performs control when the image processing apparatus 1 operates as a printer. The copy application 115 performs control when the image processing apparatus 1 operates as a copier. The scanner application 116 performs control when the image processing apparatus 1 operates as a scanner. The FAX application 117 performs control when the image processing apparatus 1 functions as a facsimile machine.

The engine controller 120 fills the role of a drive unit that controls or drives the print engine 106, the scanner unit 102, and the like. The image processing unit 130 generates picture information based on image information to be printed out, under the control of the main controller 110. Picture information herein means information to be used by the print engine 106, which serves as an image forming unit, for drawing an image to be formed in image forming operation.

Additionally, the image processing unit 130 processes image-capturing data input from the scanner unit 102 to generate image data. Image data herein means information generated as a resultant of scanner operation to be stored in a storage area of the image processing apparatus 1 or to be transmitted through the network I/F 108 to another information processing terminal or a storage apparatus.

The operation display controller 140 causes the display panel 104 to display information and notifies the main controller 110 of information input through the display panel 104. The input-output controller 150 inputs, to the main controller 110, information input through the network I/F 108. The main controller 110 controls the input-output controller 150 and accesses, through the network I/F 108 and a network, the shopping server 3 or a device connected to another network.

When the image processing apparatus 1 operates as a printer, the input-output controller 150 receives a print job through the network I/F 108. The input-output controller 150 forwards the received print job to the main controller 110. Upon receiving the print job, the main controller 110 controls the image processing unit 130 by using the above-described function of the printer application 114, so that the image processing unit 130 generates picture information based on document information or image information contained in the print job.

A print job according to this embodiment contains, as well as information on an image in which image information to be output is recorded in an information format analyzable by the image processing unit 130 of the image processing apparatus 1, information on parameters needed to be set for outputting of the image formation. Information on parameters herein means, for example, information such as setting for two-sided printing, setting for aggregate printing, and setting for color or monochrome printing.

When picture information is generated by the image processing unit 130, the engine controller 120 controls the print engine 106 so that the print engine 106 executes, based on the thus generated picture information, image formation on paper transported from the paper feeding table 105. More specifically, the image processing unit 130, the engine controller 120, and the print engine 106 function as an image formation outputting unit. As a specific aspect of the print engine 106, an inkjet image forming mechanism or an electrophotographic image forming mechanism is applicable, for example. A document on which an image has been formed by the print engine 106 is ejected onto the paper ejection tray 107.

When the image processing apparatus 1 operates as a scanner, the operation display controller 140 or the input-output controller 150 forwards a scan execution signal to the main controller 110 in response to a scan execution instruction that is input through operations on the display panel 104 by the user or input from another terminal such as the client terminal 2 through the network I/F 108. The main controller 110 controls, based on the received scan execution signal, the engine controller 120 by using the function of the above-described scanner application 116.

The engine controller 120 drives the ADF 101 to transport, to the scanner unit 102, a document set in the ADF 101 to be subjected to image capturing. The engine controller 120 then drives the scanner unit 102 to capture an image of the document transported from the ADF 101. When a document is not set in the ADF 101 but is set directly at the scanner unit 102, the scanner unit 102 captures an image of the thus set document under the control of the engine controller 120. More specifically, while the scanner unit 102 operates as an image capturing unit, the engine controller 120 functions as a reading controller.

In the image capturing operation, an image capturing element such as a charge-coupled device (CCD) included in the scanner unit 102 optically scans a document, so that image-capturing information is generated, which is generated based on optical information. The engine controller 120 forwards the image-capturing information generated by the scanner unit 102 to the image processing unit 130. The image processing unit 130 generates, under the control of the main controller 110, image information based on the image-capturing information received from the engine controller 120.

The main controller 110 acquires the image information generated by the image processing unit 130 and then stores the acquired image information in a storage medium, such as the HDD 40, attached to the image processing apparatus 1. More specifically, the scanner unit 102, the engine controller 120, and the image processing unit 130 jointly function as an image inputting unit. The image information generated by the image processing unit 130 is stored into the HDD 40 or the like as it is or is transmitted to an external apparatus through the input-output controller 150 and the network I/F 108, according to an instruction of the user.

When the image processing apparatus 1 operates as a copier, the image processing unit 130 generates picture information based on the image-capturing information received by the engine controller 120 from the scanner unit 102 or based on the image information generated by the image processing unit 130, under the control of the main controller 110 using the function of the above-described copy application 115. The engine controller 120 drives the print engine 106 based on the picture information, similarly to when the image processing apparatus 1 operates as a printer. Note that, when the information formats of the picture information and the image-capturing information are the same, the image-capturing information may be used as it is as the picture information.

Figures 5, 6:
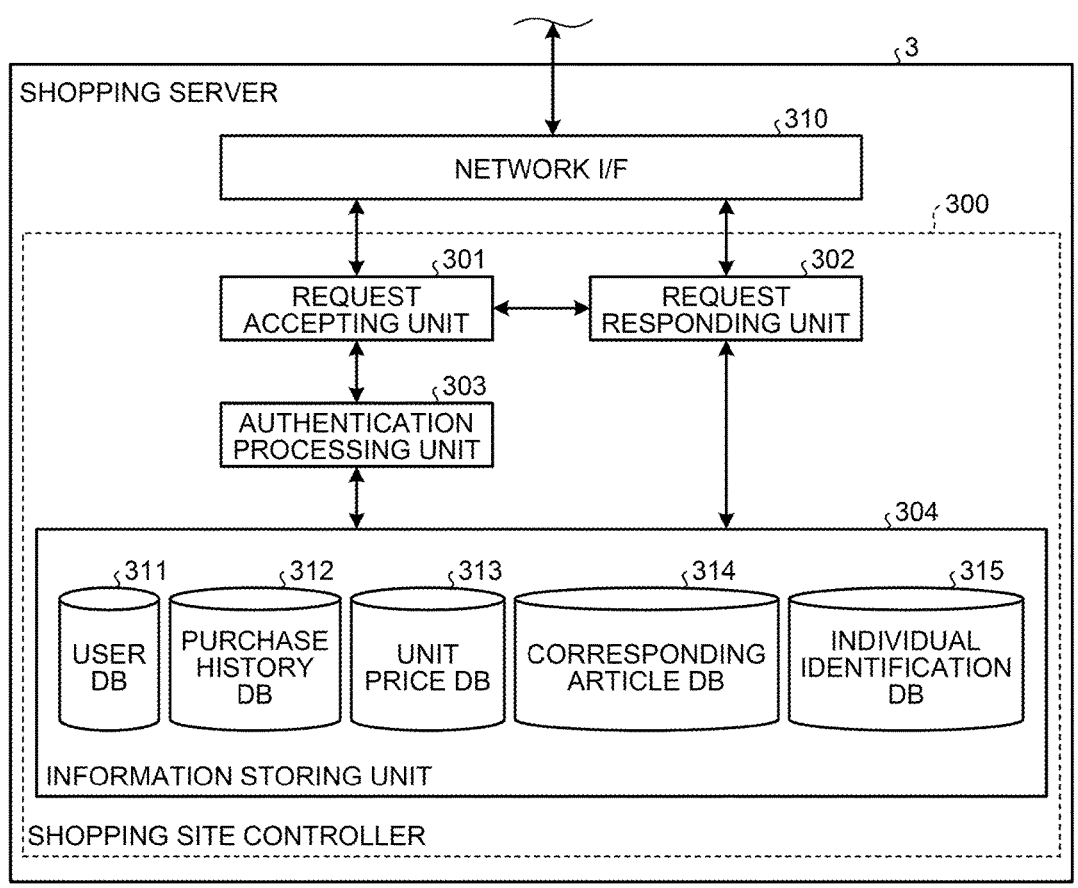
FIG. 5 is a block diagram illustrating the functional configuration of a shopping server according to the embodiment.
FIG. 6 is a diagram illustrating a user database (DB) according to the embodiment.

Next, the functional configuration of the shopping server 3 according to this embodiment is described. FIG. 5 is a block diagram illustrating the functional configuration of the shopping server 3 according to this embodiment. As illustrated in FIG. 5, the shopping server 3 according to this embodiment includes a shopping site controller 300 and a network I/F 310. The shopping site controller 300 includes a request accepting unit 301, a request responding unit 302, an authentication processing unit 303, and an information storing unit 304.

The request accepting unit 301 accepts, through the network I/F 310, a browsing request made from the outside through Web access. The request accepting unit 301 passes information to both or either of the authentication processing unit 303 and the request responding unit 302 based on specifics of the browsing request.

The request responding unit 302 transmits to the source of the browsing request, through the network I/F 310, information corresponding to the browsing request accepted by the request accepting unit 301. Information corresponding to a browsing request herein means, for example, information on a screen that has been requested from a website, more specifically, information on a webpage. When handling the request, the request responding unit 302 refers as necessary to information stored in the information storing unit 304.

When a request for authentication of login to the shopping server 3 is received by the request accepting unit 301, the authentication processing unit 303 receives authentication request from the request accepting unit 301 and authenticates the user based on information in a user database (DB) 311 contained in the information storing unit 304.

The information storing unit 304 is a storage medium storing various kinds of information that are necessary for the online shopping service provided by the shopping server 3, as illustrated in FIG. 5. As illustrated in FIG. 5, the information storing unit 304 according to this embodiment contains the user DB 311, a purchase history DB 312, a unit price DB 313, a corresponding article DB 314, and an individual identification DB 315.

FIG. 6 is a diagram illustrating information in the user DB 311 according to this embodiment. As illustrated in FIG. 6, the user DB 311 is a database that manages information on users who use the shopping site, and contains information of "user ID" serving as user identification information for identifying individual users, "login passwords" for authenticating individual users, and "organization ID" indicating organizations to which individual users belong.

Figure 7:
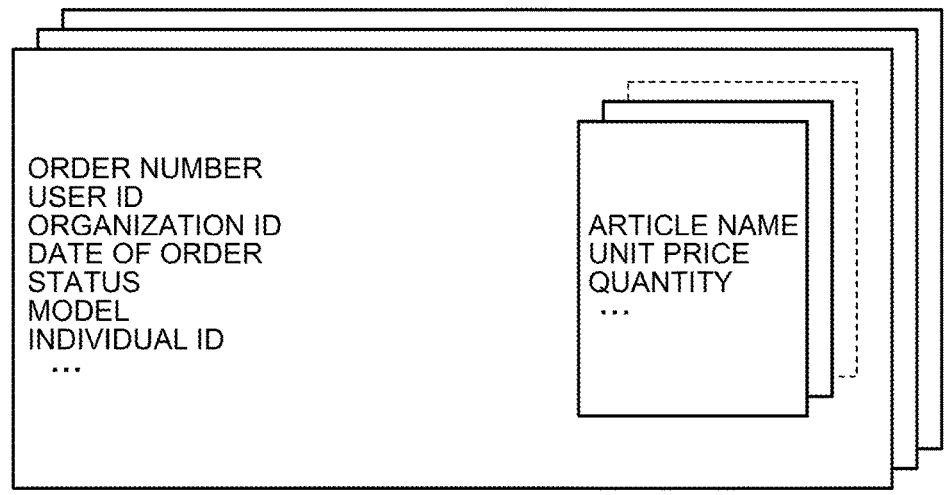
FIG. 7 is a diagram illustrating a purchase history DB according to the embodiment.

FIG. 7 is a diagram illustrating information contained in one record of the purchase history DB 312 according to this embodiment. As illustrated in FIG. 7, the purchase history DB 312 contains the following as basic information with respect to each "order number" for identifying a purchase history: "user ID" for identifying a user who has placed the order; "organization ID" for identifying an organization to which the user belongs; a "date of order" indicating a date and time when the order has been placed; a "status" indicating the status of shipping arrangement of an article, such as "preparing shipment" or "completed shipment"; a "model" of an image processing apparatus 1 from which the order has been placed; "individual ID" for identifying the image processing apparatus 1 from which the order has been placed.

Each purchase history contains a piece of detailed information indicating a purchased article, and a plurality of pieces of detailed information each thus indicating a purchased article are contained depending on the number of product lines of purchased articles. As illustrated in FIG. 7, each piece of detailed information contains information of an "article name", a "unit price", and a "quantity".

FIG. 8 is a diagram illustrating information in the unit price DB 313 according to this embodiment. For the consumables ordering system according to this embodiment, a contract determining selling prices of articles and consumables to be sold is made with respect to each organization to which an individual user belongs. The same article may be sold at different unit prices to different organizations. For this reason, in the unit price DB 313, while a predetermined "unit price" is associated with each combination of "organization ID" "article ID", a "path of article image file" containing an image of a corresponding article is also associated therewith, as illustrated in FIG. 8.

FIG. 9 is a diagram illustrating information in the corresponding article DB 314 according to this embodiment. Although the shopping site provided by the shopping server 3 offers various kinds of consumables, a model to which each consumable corresponds is fixed. As illustrated in FIG. 9, in the corresponding article DB 314 according to this embodiment, "models" of image processing apparatuses that consume consumables and "Article 1", "Article 2", and so on, which indicate consumables such as a "toner bottle" and a "process cartridge", are arranged in a matrix. Thus, consumables corresponding to the respective models are associated with the respective models. The article indicated as "item001" or the like entered in each cell in FIG. 9 corresponds to the "article ID" in FIG. 8.

FIG. 10 is a diagram illustrating information in the individual identification DB 315 according to this embodiment. An individual identification DB is information for identifying the image processing apparatus 1 as an individual, such as the serial number of a board used for constructing the controller 100 of the image processing apparatus 1. As illustrated in FIG. 10, in the individual identification DB 315, a "model" and "organization ID" for identifying an organization where a corresponding individual is operated are associated with each "individual ID".

In such a configuration, one of the key points according to this embodiment lies in the control over access to the shopping server 3 and use of the shopping site through the display panel 104 of the image processing apparatus 1. Operation of the consumables ordering system according to this embodiment is described below with reference to FIG. 11.

Figure 12A:
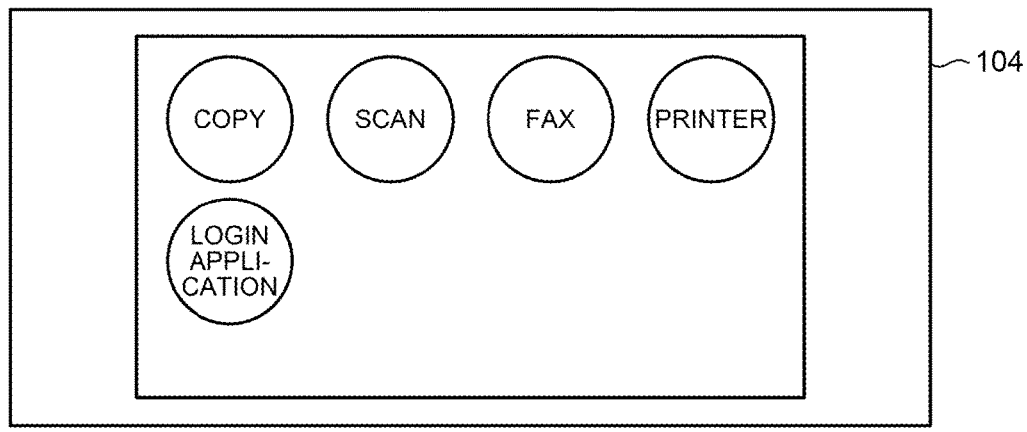
FIGS. 12A and 12B are diagrams illustrating screen displays of the image processing apparatus according to the embodiment.

FIG. 11 is a sequence diagram illustrating the operation of the consumables ordering system according to this embodiment. To start the operation illustrated in FIG. 11, the user performs a startup operation on the login application 112 by tapping an icon indicated as "Login Application" from a home screen of the display panel 104 as illustrated in FIG. 12A. The login application 112 starts up in response to the startup operation by the user (S1101), and confirms through a network, with respect to the shopping server 3, whether cooperative operation is possible requests (S1102).

At S1102, the login application 112 transmits, to the shopping server 3, the confirmation request as to whether cooperative operation is possible. In the shopping server 3, the request accepting unit 301 receives the confirmation request as to whether cooperative operation is possible, and inputs the request to the request responding unit 302. The request responding unit 302 transmits a confirmation result as to whether cooperative operation is possible to the image processing apparatus 1, according to the operating condition of the shopping server 3.

When a general Internet browser or the like accesses a website and then experiences a condition that disables display of the website, such as a temporary failure of a server providing the website, the user can recognize the failure by a time-out error returned by a function of the Internet browser. In contrast, when the login application 112 different from an Internet browser accesses a website, such a function is not available. For this reason, confirmation as to whether cooperative operation is possible is performed at S1102, so that the condition of the shopping server 3 to be accessed is checked.

Figure 12B:
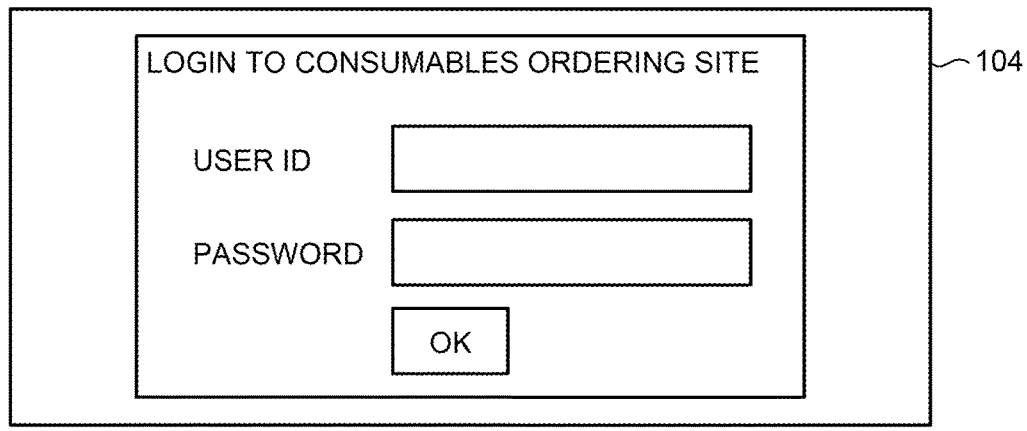

Upon receiving the result of confirmation as to whether cooperative operation is possible from the shopping server 3, the login application 112 causes the display panel 104 to display a login screen as illustrated in FIG. 12B if the result of confirmation as to whether cooperative operation is possible is "OK". More specifically, at this step, the login application 112 functions as a login-screen display processing unit.

When the user inputs a user ID and a password to the login screen illustrated in FIG. 12B, the login application 112 transmits a request for login to the shopping server 3 (S1103). More specifically, at S1103, the login application 112 functions as a login request transmitting unit. The login request contains the user ID and password input by the user on the screen illustrated in FIG. 12B.

Upon receiving the login request, the shopping server 3 processes login authentication and returns the result thereof to the image processing apparatus 1 (S1104). At S1104, the request accepting unit 301 inputs the user ID and password contained in the request for login to the authentication processing unit 303 for execution of the authentication processing.

The authentication processing unit 303 performs the authentication processing by checking the input user ID and password with the information contained in the user DB 311, and returns the result thereof to the request accepting unit 301. Upon receiving the authentication result from the authentication processing unit 303, the request accepting unit 301 inputs the authentication result to the request responding unit 302 for execution of a returning process in response to the authentication request.

Upon receiving the result of the login authentication from the shopping server 3, if the above result is "OK", the login application 112 starts up the browser application 113 so that the shopping site can be used (S1105). More specifically, at S1105, the login application 112 functions as a screen information acquisition controller that starts up the browser application 113 for acquisition of information for displaying screens of the shopping site. Furthermore, when the login has been successful, the login application 112 acquires model information and an individual ID of the image processing apparatus 1, and transmits them to the shopping server 3 in association with the user ID used for the successful login (S1106).

Of the information transmitted at S1106, the model information is model identification information for identifying the model of the image processing apparatus 1, and the individual ID is individual identification information. More specifically, at S1106, the login application 112 functions as a model identification information transmitting unit.

The model information and the individual ID of the image processing apparatus 1 are managed by the main controller 110. Model information is information corresponding to the "model" in FIG. 10, individual ID is information corresponding to the "individual ID" in FIG. 10. At S1106, the login application 112 acquires the model information and the individual ID managed by the main controller 110, and, at S1103, transmits them to the shopping server 3 while associating them with the input user ID. When the shopping site has login from an image processing apparatus 1, the process at S1106 causes the shopping server 3 to acquire the model information and the individual ID of the image processing apparatus 1. Utilization of these pieces of information in the subsequent processes is one of the key points according to this embodiment.

Usually, a request for login to the shopping server 3 is made along with a request to display a post-login screen to the shopping site. In contrast, the processes at S1103 and S1104 are executed not by the browser application 113 for displaying a shopping site but by the login application 112, and a request for login to a shopping site is a provisional login request without a request to display a screen.

This provisional login request is made for the process of transmitting the model information and the individual ID at S1106. More specifically, this embodiment has significance in that login authentication is not performed with the browser application 113 started up from the beginning and with a user ID and a password input to the browser application 113 but is performed with the login application 112 that is provided separately and that makes a provisional login request.

Thus, the function of the login application 112 enables transmission of the model information and the individual ID of the image processing apparatus 1 to the shopping server 3. Consequently, this function makes it unnecessary to provide the function of acquiring the model information and the individual ID of the image processing apparatus 1 as a function of a shopping site provided by the shopping server 3, and further eliminates the need to make any significant change to functions of a general online shopping service as a function of the shopping server 3.

Furthermore, the login application 112 is configured to acquire model information and an individual ID and transmit them to the shopping server 3. This configuration eliminates the need to use a remote monitoring system that monitors the image processing apparatus 1 through a network.

Upon starting up under the control of the login application 112 (S1107), the browser application 113 acquires authentication information, more specifically, the user ID and password input at S1103, from the login application 112 (S1108). This process at S1108 may be implemented by a function of the browser application 113 or implemented by a function of the login application 112.

Subsequently, the browser application 113 makes a request for login to the shopping server 3 based on the authentication information acquired at S1108 (S1109). At S1109, the browser application 113 configured as software for displaying screens of the shopping site makes a login request accompanied by a request to display a screen of the shopping site.

Note that, when making a login request after being started up by the login application 112, the browser application 113 makes a request for login to a special address (hereinafter, "login-application specific address") different from an address in use for login requests to a regular online shopping service. Thus, a different process using model information and an individual ID is executed in the shopping server 3 in response to a login request from the browser application 113.

Note that the above-described aspect where a special address is used as an address to which a login request is made is one aspect of a method for causing the shopping server 3 to execute special processes in response to a login request from the browser application 113. For example, either of the following manners is considered possible as an alternative aspect: a manner in which flag information indicating the need to execute special processes is added to the login request transmitted at S1109; and a manner in which the shopping server 3 is configured to determine whether a user ID is the one with which provisional login authentication has been executed at S1103 and S1104.

In the shopping server 3 that has received the request for login to the login-application specific address from the browser application 113, the authentication processing unit 303 executes a login authentication process by executing the same process as at S1104 (S1110). Since the user ID and password contained in the request for login to be processed at S1110 have been once subjected to authentication and checked at S1103 and S1104, the login authentication never fails at S1110.

Upon completion of the authentication process responding to the login request from the browser application 113, the request responding unit 302 narrows down, based on authenticated information and information acquired according to the process at S1106, information to be presented to the user (S1111). At S1111, the request responding unit 302 starts with referring to the user DB 311 illustrated in FIG. 6, then extracts an organization ID associated with the authenticated user ID, and then narrows down information in the unit price DB 313 illustrated in FIG. 8 by using the organization ID. This process generates listed information of articles for the organization to which the user whose login has been authenticated belongs and unit prices.

Furthermore, the request responding unit 302 acquires a list of articles corresponding to the image processing apparatus 1, from which the login request originates, by referring to the corresponding article DB 314 illustrated in FIG. 9 based on the model information acquired according the process at S1106. The request responding unit 302 then further narrows down information obtained by narrowing down the information in the unit price DB 313 with the organization ID, based on the articles corresponding to the image processing apparatus 1, from which the login request originates.

Note that the process of transmitting the model information and the individual ID at S1106 and the login request at S1109 are processes originating from the same image processing apparatus 1 but are separate processes. Merely executing those processes does not bring association between the information transmitted at S1106 and the login request made at S1109.

In consideration of this point, information to be transmitted at S1106 has a user ID associated therewith, the request responding unit 302 associates the two processes with each other at S1111 based on the user ID. Thus, the list of the articles can be further narrowed down based on the model information after being narrowed down with the organization ID.

An alternative manner may be adopted in which: the login application 112 generates identification information and appends it to information to be transmitted when executing the process at S1106, and passes the identification information to the browser application 113 at S1108; and the browser application 113 appends the identification information to the login request made at S1109. In this manner, based on the information transmitted from the respective processes at S1106 and S1109, the request responding unit 302 can associate these processes with each other.

This process at S1111 narrows down the information in the unit price DB 313, and results in a list of articles that have unit prices determined according to the organization to which the user whose login has been authenticated belongs and that are consumables corresponding to the image processing apparatus 1 from which the login request originates (hereinafter, "corresponding consumables price list"). Based on this corresponding consumables price list, subsequent screens of the shopping site are displayed.

Upon completion of the narrowing down of information, the request responding unit 302 generates, based on the generated corresponding consumables price list, information for displaying a post-login screen, and transmits the information to the image processing apparatus 1 (S1112). In the image processing apparatus 1 that has received the information for displaying the screen, the browser application 113 displays the post-login screen on the display panel 104 (S1113). More specifically, at S1113, the browser application 113 functions as a screen display processing unit. This process completes the operation for logging in to the shopping server 3 through the image processing apparatus.

Figure 13A:
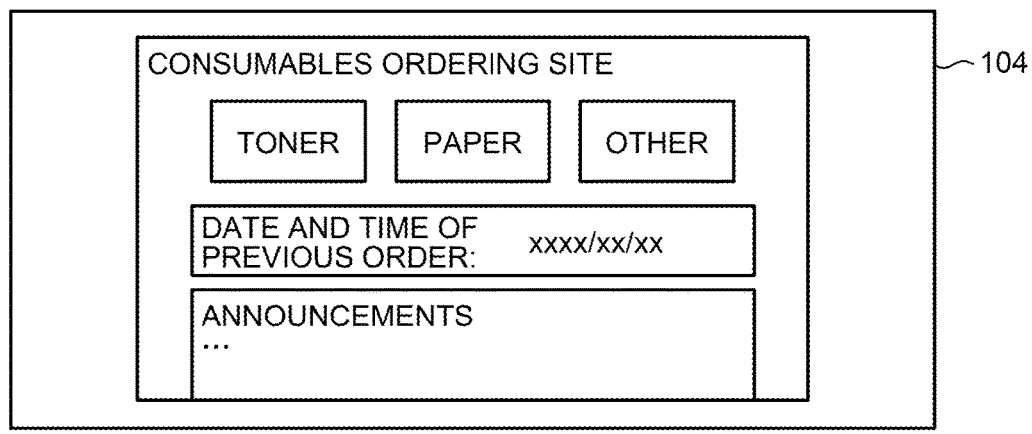
FIGS. 13A to 13C are diagrams illustrating screen displays of the image processing apparatus according to the embodiment.

FIG. 13A is a diagram illustrating an example of the post-login screen displayed on the display panel 104 by the process at S1113. The post-login screen is a screen to be displayed first after the login request is authenticated. As illustrated in FIG. 13A, on the post-login screen, buttons to select consumables to be ordered, such as "TONER", "PAPER", and "OTHER", are displayed. When each of the buttons is tapped, the shopping server 3 is notified of a kind of consumables corresponding to the tapped button.

Here, a login request that has been directly authenticated for displaying the screen illustrated in FIG. 13A is the login request transmitted at S1109 in FIG. 11. Nevertheless, it is at the time of the process at S1103 that the user inputs authentication information for a login request. After the login request at S1103 is authenticated, the processes up to the screen display at S1113 are automatically executed irrespective of user operations. Thus, the screen illustrated FIG. 13A is the first screen to be displayed after the login request at S1103 is authenticated.

In the shopping server 3, the request responding unit 302 narrows down the information in the above-described corresponding consumables price list according to the kind of consumables that the shopping server 3 is notified of by the image processing apparatus 1. The request responding unit 302 then generates information for displaying a screen displaying prices and images of consumables obtained by the narrowing down, and transmits the information to the image processing apparatus 1. By this process, a screen on which a list of corresponding consumables is displayed as illustrated in FIG. 13B is displayed on the display panel 104 of the image processing apparatus 1.

Figure 13B:
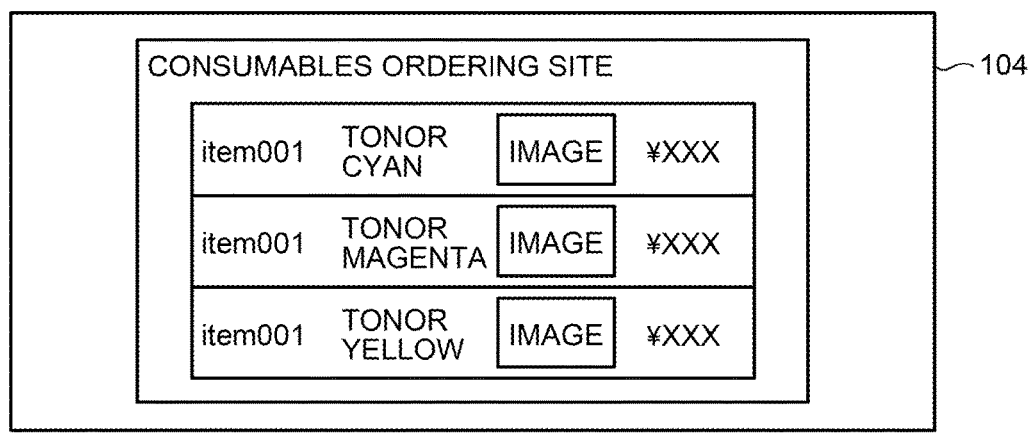

FIG. 13B is a diagram illustrating a screen displayed when "TONER" is tapped on the screen in FIG. 13A. As described above, the screen illustrated in FIG. 13B displays, as the corresponding consumables price list, a list having pieces of information from the unit price DB 313 that are obtained by narrowing down the information therein based on the organization ID and the model. In other words, the browser application 113 according to this embodiment displays, as articles to be sold, consumables extracted based on the model information transmitted by the login application 112 out of consumables that are being sold on the shopping service provided by the shopping server 3.

A consumable can be ordered through the display panel 104 of the image processing apparatus 1 when the consumable is selected from those displayed on a screen such as the one illustrated in FIG. 13B. When a consumable is ordered, the information described in connection with FIG. 7 is transmitted as order information from the image processing apparatus 1 to the shopping server 3. More specifically, the browser application 113 functions as an order-information transmitting unit that controls a screen display based on information for displaying a screen such as the one in FIG. 13B.

Here, in the system according to this embodiment, not only information such as the "order number", the "user ID", the "date of order", and details of an article to be ordered, but also information of the "model" and the "individual ID" are transmitted as the order information from the image processing apparatus 1 to the shopping server 3 to be managed as information describing a purchase history as illustrated in FIG. 7. This management makes it possible to identify, after placement of an order for an article, an image processing apparatus 1 from which the order has originated, more specifically, an image processing apparatus 1 for which the article has been ordered as a consumable. Note that the "model" and the "individual ID" transmitted as the order information can be acquired in the same manner as at S1106 in FIG. 11.

The above-described configuration enables the user to browse a screen for purchasing, at contracted prices, only consumables intended to be sold to the organization to which the user belongs, out of consumables that the shopping server 3 sells.

In the system according to this embodiment, a function of the login application 112 operates to notify the shopping server 3 of the model information of an image processing apparatus 1 that has been operated for login to the shopping server 3. Thus, a shopping screen displays, as articles available for shopping, only consumables corresponding to the image processing apparatus 1. This manner of displaying articles makes it unnecessary to ascertain consumables corresponding to the image processing apparatus 1 with reference to the model numbers or the like, enables an unaccustomed user to correctly and easily order consumables when ordering the consumables, and enables a user to more easily select and order consumables.

Furthermore, as illustrated in FIG. 13A, the post-login screen according to this embodiment displays the date and time of the previous order. Displaying of such information is implemented by configuring the request responding unit 302 to refer to the purchase history DB 312 illustrated in FIG. 7 when generating the information for displaying the post-login screen at S1112.

Specifically, when generating the information for displaying the post-login screen at S1112, the request responding unit 302 narrows down information in the purchase history DB 312 based on the individual ID. In this manner, only information having "individual ID" matched with the individual ID acquired according to the process at S1106 is extracted from the information contained in the purchase history DB 312.

After narrowing down the information contained in the purchase history DB 312, the request responding unit 302 refers to "dates of order" in the extracted information to generate information for displaying the date and time of the previous order illustrated in FIG. 13A. Specifically, the request responding unit 302 adopts, as the date and time of the previous order, the latest date and time out of the "dates of order" contained in the extracted information, and generates the information for displaying it.

Figure 13C:
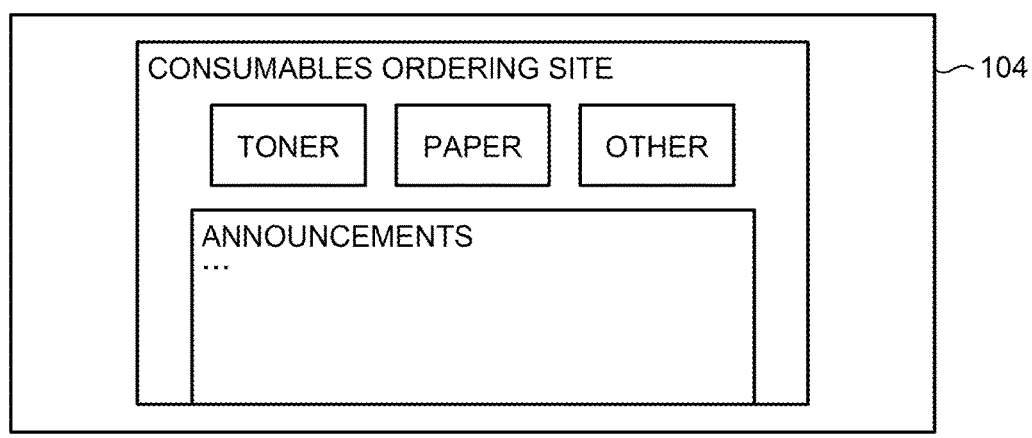

Note that, if narrowing down the purchase history DB 312 has resulted in extraction of no information, more specifically, if there is no purchase history associated with the individual ID, the post-login screen not displaying the date and time of the previous order as illustrated in FIG. 13C is displayed. Other than when there is no purchase history associated with the individual ID as described above, the post-login screen not displaying the date and time of the previous order as illustrated in FIG. 13C may be displayed when the most recent one of the "dates and times of previous order" is older than a predetermined threshold.

This displaying of the date and time of the previous order is mainly used for a process for cancelling an order. Next, operation for cancelling an order in the consumables ordering system according to this embodiment is described with reference to FIG. 14. When the user taps a display part indicating the date and time of the previous order illustrated in FIG. 13A, the browser application 113 transmits a request to display a screen for details of the previous order (S1401).

Here, the information for displaying a post-login screen that displays the date and time of the previous order as illustrated in FIG. 13A contains the "order number" of purchase history information from which the date and time of previous order is extracted, and the request to display the details screen transmitted at S1401 contains that "order number". In the shopping server 3, the request accepting unit 301 accepts the request to display the details screen, and inputs it to the request responding unit 302.

The request responding unit 302 extracts, from the purchase history DB 312, purchase history information corresponding to the "order number" contained in the request to display the details screen, generates information for displaying the detailed screen for the order, and transmits the information to the image processing apparatus 1 (S1402). In this manner, the screen describing the details of the order as illustrated in FIG. 15 is displayed on the display panel 104 of the image processing apparatus 1 according to a process performed by the browser application 113 (S1403).

As illustrated in FIG. 15, the screen describing the details of the order displays an operation unit for requesting cancellation of the order, the browser application 113 transmits a request to cancel the order to the shopping server 3 when the user taps the operation part (S1404). The request to cancel the order transmitted at S1404 contains, an "order number" indicating an order to be cancelled, more specifically, the same information as an "order number" contained in the display request transmitted at S1401.

Upon accepting the cancellation request, the shopping server 3 transmits, to the image processing apparatus 1, information for displaying a cancellation confirmation screen as illustrated in FIG. 16 (S1405). By this process, the cancellation confirmation screen as illustrated in FIG. 16 is displayed on the display panel 104 of the image processing apparatus 1 (S1406).

When the user taps a button stating "ORDER CANCELLATION" on the cancellation confirmation screen illustrated in FIG. 16, the browser application 113 transmits a request to finalize cancellation to shopping server 3 (S1407). In the shopping server 3, the request responding unit 302 acquires the request to finalize the cancellation through the request accepting unit 301, and executes a process to cancel the order (S1408).

The request to finalize cancellation transmitted at S1407 contains an "order number" that indicates the order to be cancelled. Subsequently, at S1408, the request responding unit 302 extracts, from the purchase history DB 312, purchase history information having the "order number" contained in the request to confirm cancellation, and changes the value of information on its "status" to a value indicating that cancellation has been requested.

Upon completing a cancellation process, the request responding unit 302 generates a screen indicating that the order has been cancelled, and transmits the screen to the image processing apparatus 1 (S1409). As a result, the screen indicating that the order has been cancelled is displayed on the display panel 104 of the image processing apparatus 1 (S1410). Such a process completes the operation to cancel an order according to this embodiment.

As described above, in the consumables ordering system according to this embodiment, when a login has been made through the image processing apparatus 1 to the shopping service provided by the shopping server 3, the shopping server 3 is notified of not only information on the model of an image processing apparatus 1 but also information with which an individual can be identified. As described in connection with FIG. 14, this configuration enables efficient extraction of order histories of consumables ordered through the image processing apparatus 1 and can provide improved convenience to users in handling, for example, the process for cancelling an order.

Note that, while the post-login screen displays the date and time of the previous order as described in connection with FIG. 13A, this screen is displayed mainly to be used in cancellation of an order as described in connection with FIG. 14. Therefore, the request responding unit 302 may be configured to refer to the "status" in the purchase history information when extracting information from the purchase history DB 312 for generating the post-login screen, and generate a screen displaying the date and time of the previous order as illustrated in FIG. 14 only when the order is in a state where it is cancellable.

The request responding unit 302 may be similarly configured to refer to the "status" in the purchase history information also when extracting information from the purchase history DB 312 for generating a screen describing the details of a history as illustrated in FIG. 15, and generate a screen displaying a button having such a statement as "WANT THIS ORDER CANCELLED" as illustrated in FIG. 15 only when the order is in a state where it is cancellable. A state in the "status" where an order is cancellable is, for example, a state of an ordered article when the article is yet to be shipped. Such determination can be implemented, for example, by previously generating information where values of the "status" in the purchase history are associated with corresponding values of whether cancellation is allowed, as illustrated in FIG. 17.

Although the embodiment illustrates an example where cancellation of an order is permitted irrespective of the "user ID" in the purchase history information, the embodiment may be configured to permit cancellation of an order only when a user ID authenticated for login and the "user ID" in the purchase history information match each other. This configuration can prevent a situation where a consumable ordered by a first user is cancelled by a second user without the first user's knowledge.

Next, a case where the shopping server 3 has been accessed through the client terminal 2 is described. When accessing the shopping server 3 through the client terminal 2, a user operates an Internet browser installed in the client terminal 2 and similar to the browser application 113, so that access to the shopping server 3 is executed and that a login screen similar to the screen described in connection with FIG. 12B is displayed at the client terminal 2.

When the user inputs authentication information to the login screen displayed at the client terminal 2 in the same manner as at S1103 in FIG. 11, a request to login accompanied by the request to display a post-login screen is transmitted from the client terminal 2 to the shopping server 3. Subsequently, in the shopping server 3, in the same manners as in the processes at S1110 and S1112 in FIG. 11, the post-login screen is generated after successful login authentication and transmitted to the client terminal 2. These processes cause the post-login screen to be displayed at the client terminal 2.

In the client terminal 2, differently from the image processing apparatus 1, information is narrowed down only based on an organization ID associated with a user ID authenticated for login because information is not narrowed down with the model information. Consequently, all of consumables having unit prices registered for organization to which the user belong are selected as articles available for purchase when the shopping server 3 is accessed through the client terminal 2.

In the above-described case where the shopping server 3 is accessed through the image processing apparatus 1, purchase histories are narrowed down with individual ID, so that histories of orders placed by operating a corresponding image processing apparatus 1 are extracted as those to be displayed, for checking of purchase histories through checking of the details of the previous orders. In contrast, when the shopping server 3 is accessed through the client terminal 2, purchase histories with a user ID authenticated for login or with an organization ID associated with the user ID are extracted as those to be displayed.

Note that, when a consumable is ordered with the client terminal 2 accessing the shopping server 3, individual ID is not acquired in the ordering, and the "individual ID" illustrated in FIG. 7 is not saved as information on purchase histories. Therefore, it is impossible to identify an apparatus to which the order of the consumable corresponds. In response, individual ID of an apparatus for which a consumable is ordered is appended when a consumable is ordered. Thus, an apparatus for which each order is placed can be later identified as in the case of ordering through the image processing apparatus 1.

Such an aspect can be implemented by providing, to a screen for transmitting order information through the client terminal 2 by using a shopping site of the shopping server 3, a field for inputting the individual ID of a corresponding apparatus that consumes a consumable to be ordered. Note that, in order to facilitate the input of the individual ID in this aspect, the client terminal 2 may be configured to acquire, through a network such as a LAN, the individual ID of an image processing apparatus 1 connected to the network, and display the individual ID as an option in the above-described input field.

Figure 18:
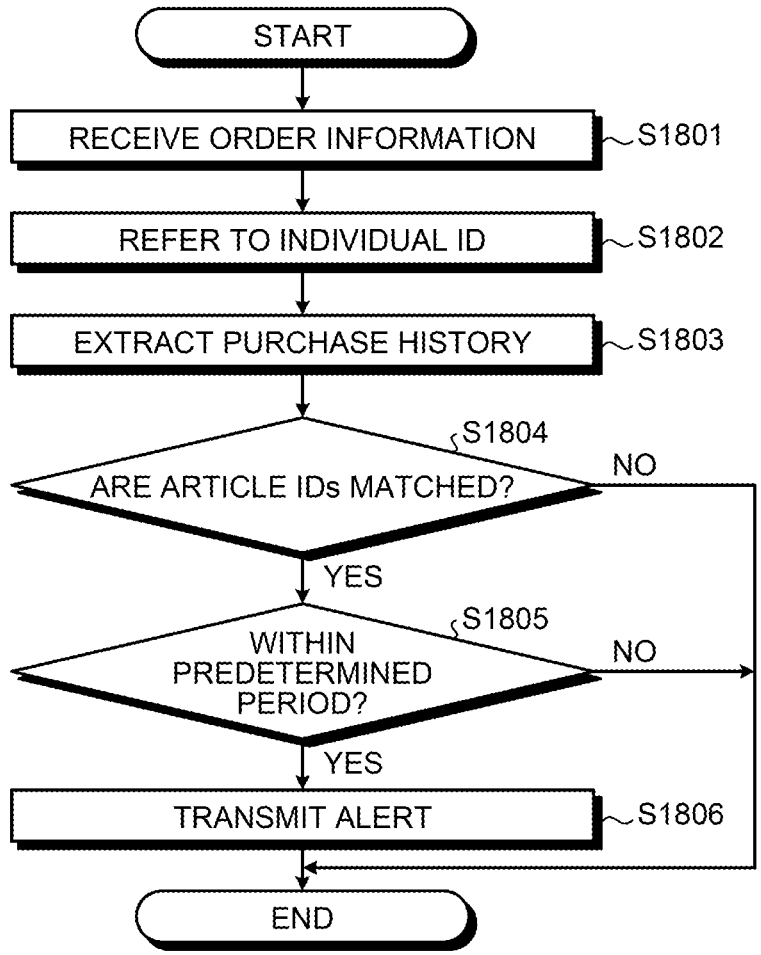
FIG. 18 is a flowchart illustrating duplicate-order preventing operation according to the embodiment.

Note that appending "individual ID" to the order information also enables a process for preventing a duplicate order. A method for such a purpose is described with reference to FIG. 18. As illustrated in FIG. 18, when order information is received by the shopping server 3 (S1801), the request responding unit 302 refers to "individual ID" appended to the order information (S1802), and extracts information of purchase histories having the same individual ID from the purchase history DB 312 (S1803).

If there are any pieces of information of the purchase histories that have the same article ID (Yes at S1804), the request responding unit 302 refers to the "dates of order" of corresponding orders to determine whether the dates of order are within a predetermined period, more specifically, whether the same consumable has been ordered for the same image processing apparatus 1 within the predetermined period (S1805).

As a result of the determination at S1805, if there is any date of order within the predetermined period (Yes at S1805), the request responding unit 302 generates an alert for warning against a duplicate order and transmits the alert to the image processing apparatus 1 (S1806), and this step completes the process. On the other hand, if there is no history having the same article ID (No at S1804), or if the elapsed time from the date of order surpasses the predetermined period for any history having the same article ID (No at S1805), the process is merely terminated.

In the image processing apparatus 1 that has received the alert generated at S1806, a screen for selecting whether to place the duplicate order is displayed on the display panel 104. If the result of an operation of a user for responding to the screen is to place the duplicate order, the operation result is transmitted to the shopping server 3, where the order is processed in a normal manner. On the other hand, if the result of the operation of the user is not to place the duplicate order, the article selection screen is displayed again in the course of communication with the shopping server.

The system according to this embodiment enables placement of orders through the image processing apparatus 1, thereby enabling any authorized user to easily order a consumable when replacement of the consumable is necessary, such as when toner has run out, or when the expiration date for use of a process cartridge has come. Thus, there is a possibility of incurring a duplicate order. However, a process such as the one illustrated in FIG. 18 makes it possible to avoid an incident that results in execution of a duplicate order.

In the descriptions of the above-described embodiment, the model information and the individual ID are taken as an example of the information transmitted to the shopping server 3 in response to the login authentication process performed by the login application 112. Other than these pieces of information, for example, information on conditions of the image processing apparatus 1 may be transmitted to the shopping server 3 at S1106. Such information allows the shopping server 3 to display a screen of the shopping site according to the conditions of the image processing apparatus 1.

Figure 19:
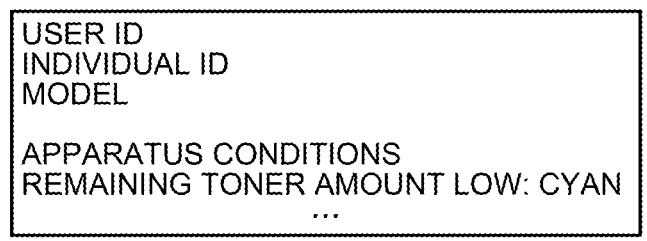
FIG. 19 is a diagram illustrating an example of information transmitted by a login application according to the embodiment.

FIG. 19 is a diagram illustrating an example of information transmitted at S1106 from the login application 112 to the shopping server 3. As illustrated in FIG. 19, information indicative of toner with a low remaining amount and the color of the toner, for example, in the form of statement describing "REMAINING TONER AMOUNT LOW: CYAN" can be displayed as an "apparatus condition" in addition to information of the "user ID", the "individual ID", and the "model".

Figure 20:
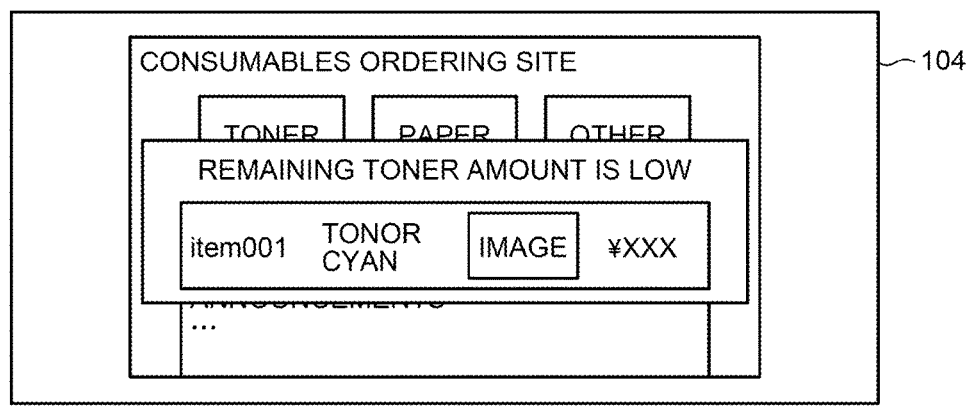
FIG. 20 is a diagram illustrating a screen display of the image processing apparatus according to the embodiment.

FIG. 20 is a diagram illustrating an example of the post-login screen displayed by the browser application 113 when, after information as illustrated in FIG. 19 is transmitted to the shopping server 3 is transmitted at S1106, a request for authentication of login is transmitted by the browser application 113 with the same "user ID". As illustrated in FIG. 20, upon receiving the information illustrated in FIG. 19 such that "REMAINING TONER AMOUNT LOW: CYAN", the request responding unit 302 generates a screen for recommending purchasing cyan toner, and transmits the screen to the image processing apparatus as the post-login screen. Such a process as described here makes it possible to provide a shopping service according to conditions of the image processing apparatus 1.

In the case taken as an example described in connection with FIG. 11, the model information and the individual ID are transmitted from the login application 112 to the shopping server 3 after information exchange for login authentication between the login application 112 and the shopping server 3 is executed at S1103 and S1104. However, this is merely an example, and the model information and the individual ID may be transmitted in addition to the authentication information at S1103, for example.

In such a case, the same effects as those described above can be attained by configuring the shopping server 3 so that the request responding unit 302 can temporarily store the model information and the individual ID in association with the user ID and, upon receipt of a login request from the browser application 113 with the same user ID, execute the processes based on the model information and the individual ID as described above.

The present invention makes it easier for a user to select and order a consumable in management of an apparatus that contains consumables and implements a specialized function.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the RAM, such as a cache memory of the CPU, may function as a physical memory or a primary memory of the apparatus, while the HDD may function as a secondary memory of the apparatus.

What is claimed is:

1. An image processing apparatus that implements a specific function by using consumables contained therein, the image processing apparatus comprising:
a display panel;
a memory storing computer-readable instructions; and
a processor configured to execute the computer-readable instructions to,
cause the display panel to display a login screen enabling a login request to be made to an online shopping service configured to sell the consumables through a network;
transmit the login request to the online shopping service, the login request including authentication information input by a user through the login screen;
transmit, to the online shopping service in response to authentication of the login request, model identification information identifying a model of the image processing apparatus, individual identification information uniquely identifying the image processing apparatus, and condition information relating to a status of one or more consumables contained in the image processing apparatus;
transmit, to the online shopping service, a browsing request to acquire information about the consumables being offered by the online shopping service that correspond to the image processing apparatus, the browsing request including the authentication information of the user, the online shopping service being configured to extract a list of corresponding consumables by referring to one or more databases stored by the online shopping service based on the authentication information of the user, the model identification information, and the individual identification information of the image processing apparatus, in response to authentication of the browsing request; and
cause the display panel to display a graphical user interface enabling use of the online shopping service by the user to order one or more consumables corresponding to the image processing apparatus, wherein the graphical user interface comprises
a post-login screen, displayed in response to authentication of the browsing request, displaying a plurality of selectable types of consumables corresponding to the image processing apparatus, and a recommendation for the user to order a particular type of corresponding consumable from among the plurality of selectable types of corresponding consumables based on the condition information; and
a shopping screen, displayed in response to the user selecting a type of corresponding consumable via the post-login screen, displaying a narrowed list of corresponding consumables including at least prices and images of corresponding consumables of the selected type acquired from the online shopping service, out of the extracted list of corresponding consumables, as articles offered to be sold.

2. The image processing apparatus according to claim 1, wherein the browsing request is made to the online shopping service by accessing an address on the network through which the graphical user interface enabling use of the online shopping service by the user is provided.

3. The image processing apparatus according to claim 1, wherein the processor is further configured to execute the computer-readable instructions to:
generate and transmit, in response to the user performing an operation to order a consumable through the graphical user interface enabling use of the online shopping service by the user, a piece of order information that contains the individual identification information of the image processing apparatus, and cause a most recent piece of order information associated with the individual identification information of the image processing apparatus to be displayed first after successful authentication of the browsing request, out of pieces of order information managed by the online shopping service.

4. The image processing apparatus according to claim 3, wherein the processor is further configured to execute the computer-readable instructions to cause, in response to an order date and time of the most recent piece of order information being within a particular time period, an operation screen to be displayed enabling a cancellation request to be made to the online shopping service to cancel an order to which the most recent piece of order information pertains.

5. The image processing apparatus according to claim 3, wherein the pieces of order information managed by the online shopping service contain information indicating a status of a shipping arrangement with respect to a consumable to which a corresponding order pertains, and the processor is further configured to execute the computer-readable instructions to cause, in response to the most recent piece of order information having a particular state as the status of the shipping arrangement, an operation screen to be displayed enabling a cancellation request to be made to the online shopping service to cancel an order to which the most recent piece of order information pertains.

6. A consumables ordering system for ordering consumables from an online shopping service through an image processing apparatus, the consumables being intended for use in the image processing apparatus to implement a specific function, wherein the image processing apparatus comprises a display panel, a memory storing computer-readable instructions, and a processor configured to execute the computer-readable instructions to:

cause the display panel to display a login screen enabling a login request to be made to an online shopping service configured to sell the consumables through a network;

transmit the login request to the online shopping service, the login request including authentication information input by a user through the login screen;

transmit, to the online shopping service in response to authentication of the login request, model identification information identifying a model of the image processing apparatus, individual identification information uniquely identifying the image processing apparatus, and condition information relating to a status of one or more consumables contained in the image processing apparatus;

transmit, to the online shopping service, a browsing request to acquire information about the consumables being offered by the online shopping service that correspond to the image processing apparatus, the browsing request including the authentication information of the user, the online shopping service being configured to extract a list of corresponding consumables by referring to one or more databases stored by the online shopping service based on the authentication information of the user, the model identification information, and the individual identification information of the image processing apparatus, in response to authentication of the browsing request; and cause the display panel to display a graphical user interface enabling use of the online shopping service by the user to order one or more consumables corresponding to the image processing apparatus, wherein the graphical user interface comprises a post-login screen, displayed in response to authentication of the browsing request, displaying a plurality of selectable types of consumables corresponding to the image processing apparatus, and a recommendation for the user to order a particular type of corresponding consumable from among the plurality of selectable types of corresponding consumables based on the condition information; and a shopping screen, displayed in response to the user selecting a type of corresponding consumable via the post-login screen, displaying a narrowed list of corresponding consumables including at least prices and images of corresponding consumables of the selected type acquired from the online shopping service, out of the extracted list of corresponding consumables, as articles offered to be sold, and a service providing server that provides the online shopping service is configured to extract the list of corresponding consumables from the one or more databases stored by the online shopping service based on the model identification information and the individual identification information of the image processing apparatus, generate the graphical user interface, and transmit the narrowed list of corresponding consumables of the selected type to the image processing apparatus.

7. The consumables ordering system according to claim 6, wherein the browsing request is made to the online shopping service by accessing an address on the network through which the graphical user interface enabling use of the online shopping service by the user is provided.

8. The consumables ordering system according to claim 6, wherein the processor is further configured to execute the computer-readable instructions to:

generate and transmit, in response to the user performing an operation to order a consumable through the graphical user interface enabling use of the online shopping service by the user, a piece of order information that contains the individual identification information of the image processing apparatus, and cause a most recent piece of order information associated with the individual identification information of the image processing apparatus to be displayed first after successful authentication of the browsing request, out of pieces of order information managed by the online shopping service.

9. The consumables ordering system according to claim 8, wherein the processor is further configured to execute the computer-readable instructions to cause, in response to an order date and time of the most recent piece of order information being within a particular time period, an operation screen to be displayed enabling a cancellation request to be made to the online shopping service to cancel an order to which the most recent piece of order information pertains.

10. The consumables ordering system according to claim 8, wherein the pieces of order information managed by the online shopping service contain information indicating a status of a shipping arrangement with respect to a consumable to which a corresponding order pertains, and the processor is further configured to execute the computer-readable instructions to cause, in response to the most recent piece of order information having a particular state as the status of the shipping arrangement, an operation screen to be displayed enabling a cancellation request to be made to the online shopping service to cancel an order to which the most recent piece of order information pertains.

11. A computer program product comprising a non-transitory computer-readable medium containing an information processing program enabling use of an online shopping service configured to sell consumables through a network by an image processing apparatus that implements a specific function by using consumables contained therein, the information processing program when executed causing the image processing apparatus to:

cause a display panel to display a login screen enabling a login request to be made to the online shopping service;

transmit the login request to the online shopping service, the login request including authentication information input by a user through the login screen;

transmit, to the online shopping service in response to authentication of the login request, model identification information identifying a model of the image processing apparatus, individual identification information uniquely identifying the image processing apparatus, and condition information relating to a status of one or more consumables contained in the image processing apparatus;

transmit, to the online shopping service, a browsing request to acquire information about the consumables being offered by the online shopping service that correspond to the image processing apparatus, the browsing request including the authentication information of the user, the online shopping service being configured to extract a list of corresponding consumables by referring to one or more databases stored by the online shopping service based on the authentication information of the user, the model identification information, and the individual identification information of the image processing apparatus, in response to authentication of the browsing request; and cause the display panel to display a graphical user interface enabling use of the online shopping service by the user to order one or more consumables corresponding to the image processing apparatus, wherein the graphical user interface comprises a post-login screen, displayed in response to authentication of the browsing request, displaying a plurality of selectable types of consumables corresponding to the image processing apparatus, and a recommendation for the user to order a particular type of corresponding consumable from among the plurality of selectable types of corresponding consumables based on the condition information; and a shopping screen, displayed in response to the user selecting a type of corresponding consumable via the post-login screen, displaying a narrowed list of corresponding consumables including at least prices and images of corresponding consumables of the selected type acquired from the online shopping service, out of the extracted list of corresponding consumables, as articles offered to be sold.

12. The image processing apparatus according to claim 1, wherein:

the post-login screen comprises, a first window displaying the plurality of selectable types of consumables corresponding to the image processing apparatus, and a second window, overlaid on the first window, displaying the recommendation for the user to order the particular type of corresponding consumable based on the condition information.

13. The image processing apparatus according to claim 12, wherein:

the first window of the post-login screen further displays a date and time of a previous order based on the individual identification information of the image processing apparatus.

* * * * *